Sept. 15, 1970　　　　　R. W. HAND　　　　　3,528,191
RODENT ELIMINATING DEVICE
Filed April 28, 1969

INVENTOR
*Richard W. Hand*

3,528,191
RODENT ELIMINATING DEVICE
Richard W. Hand, 142 Swallow Drive,
Dayton, Ohio 45415
Filed Apr. 28, 1969, Ser. No. 819,725
Int. Cl. A01m 23/10
U.S. Cl. 43—64                    4 Claims

ABSTRACT OF THE DISCLOSURE

A stationary ramp formed from a scented strip of wood rests upon the rim of a standard pail containing a quantity of water. A rod clamped to the rim of the pail by adjustable U-shaped clamps supports a rotating cylinder having a food paste along its center exterior, the rodent trying to get to the paste on the rotatable cylinder falls into the water and drowns.

---

This invention relates to traps and the like for eliminating rodents.

It is therefore the main purpose of this invention to provide a rodent eliminating device which will have a ramp portion consisting of a strip of wood or the like which will be scented with food, one end of the strip of wood being positioned on top of the rim of a standard pail and spaced apart from a rotatable cylinder, a portion of the periphery being covered with a suitable food paste.

Another object of this invention is to provide a rodent eliminating device which will have a hollow cylinder supported upon an elongated rod, the rod being carried within U-shaped clamp members having thumbscrew means to tighten the clamps to the rim of a standard pail of any size, the cylinder being spaced from the strip of wood so that the rodent when attempting to obtain the food paste on the cylinder will fall into the water contained within the pail whereupon the rodent dies by drowning.

A further object of this invention is to provide a device of the described type which may be attached to a variety of suitable containers by the rod being of sufficient length to allow the adjustment of the clamp portions of the device.

Other objects of the present invention are to provide a roden eliminating device which is simple in design, inexpensive to manufacture, rugged in construction, easy to use and efficient in operation.

These and other objects will become readily evident upon a study of the following specifications together with the accompanying drawing wherein.

Figure 1:
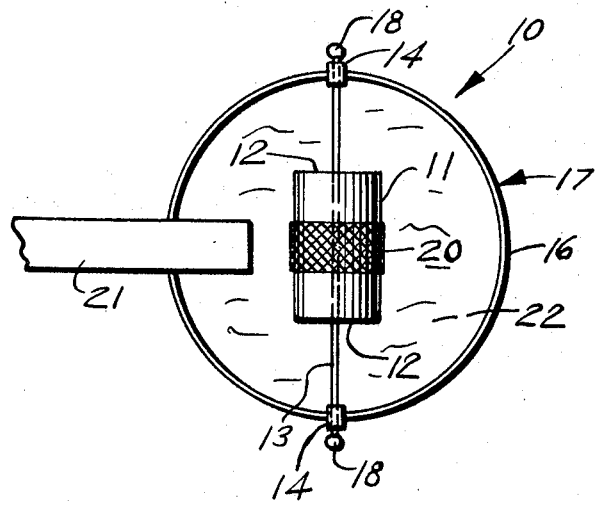
FIG. 1 is a top plan view of the present invention.
Figure 2:
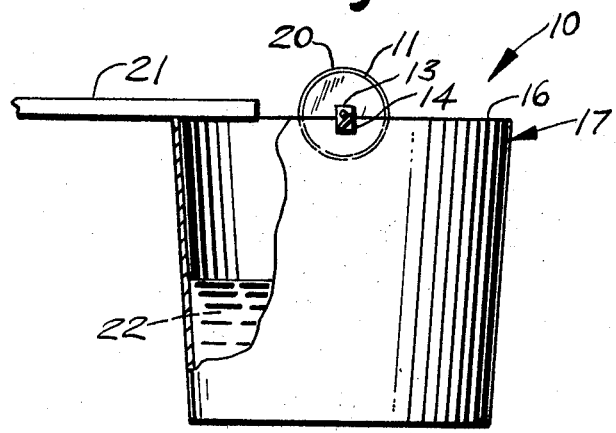
FIG. 2 is a side view of FIG. 1 shown in elevation and partly broken away.
Figure 3:
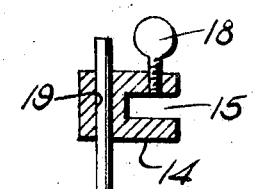
FIG. 3 is an enlarged vertical view of the drum support rod and adjustable clamps shown in elevation and partly broken away.
Figure 3:
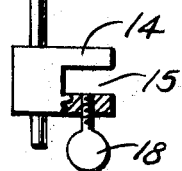

According to this invention, a rodent eliminating device 10 includes a cylinder 11 made of suitable material having end walls 12 through which an elongated rod 13 is carried. A pair of U-shaped clamp members 14 provide a means of positioning device 10 by the openings 15 of clamps 14 receiving the rim 16 of a standard pail 17. The clamps 14 carry thumbscrews 18 which enable the clamp members 14 to be secured to the rim 16 of pail 17. Rod 13 is carried within the openings 19 of clamp members 14 and the clamp members 14 are slideable upon the rod 13 to any desired position. A suitable food paste 20 is applied to the outer periphery of cylinder 11 in order to attract rodents, (not shown) and a strip of wood 21 of suitable width and thickness rests upon the rim 16 of pail 17 and is spaced from cylinder 11 and is treated with the scent of a food paste 20, the strip of wood 21 being placed in alignment with a known rodent path. When the mouse or rat smells the food paste 20, it will travel along the strip of wood 21 over the water 22 within pail 17. When the rodent attempts to reach the paste 20 upon cylinder 11 the cylinder 11 when touched will rotate and cause the rodent to lose its footing whereupon its will fall into the water 22 and drown.

When device 10 is installed onto a standard pail 17 the clamp members 14 placed upon the rim 16 are tightened by means of thumbscrews 18 so that the cylinder 11 is located over the center of pail 17.

What I now claim is:

1. A rodent eliminating device comprising an elongated rod, a rotatable cylinder carried by said rod providing a means for causing the rodent to lose its footing, a pair of U-shaped clamp members carried by said rod providing securement means for said rod to a pail, a strip of wood for use with said device providing walkway means for said rodents.

2. The combination according to claim 1, wherein said U-shaped clamps are positioned on the rim of said pail which contains a quantity of water and thumbscrews carried by said clamps provide a means for securing said clamps in position stationary upon the rim of said pail.

3. The combination according to claim 2, wherein said rod of said device is slideable within a transverse opening to said clamps so that said rod may be adaptable to pails of various diameters and said rod is carried through the center of the end walls of said cylinder, said cylinder having a food paste applied to its outer periphery on the center of its length in order to attract rodents.

4. The combination according to claim 3, wherein said cylinder spaced apart from one end of said strip of wood, said strip of wood forming a scented walkway to said food paste upon the outer periphery of said cylinder, the rodent travelling along said strip of wood tries to eat said food paste upon said cylinder and when attempting to do so touches said cylinder and the weight of said rodent being towards said cylinder causes said cylinder to rotate and thus the rodent loses its footing and falls into said water within said pail and drowns.

References Cited

UNITED STATES PATENTS

| | | | |
|---|---|---|---|
| 1,050,220 | 1/1913 | Link | 43—71 |
| 2,504,359 | 4/1950 | Tabin | 43—64 |
| 2,619,765 | 12/1952 | Sees | 43—64 |

WARNER H. CAMP, Primary Examiner